Dec. 31, 1929.                    M. L. AST                    1,741,753
                            CHEESE CUTTING MACHINE
                              Filed July 21, 1928           2 Sheets-Sheet 1

Inventor:
Michael Ludwig Ast
By W. E. Williams Atty.

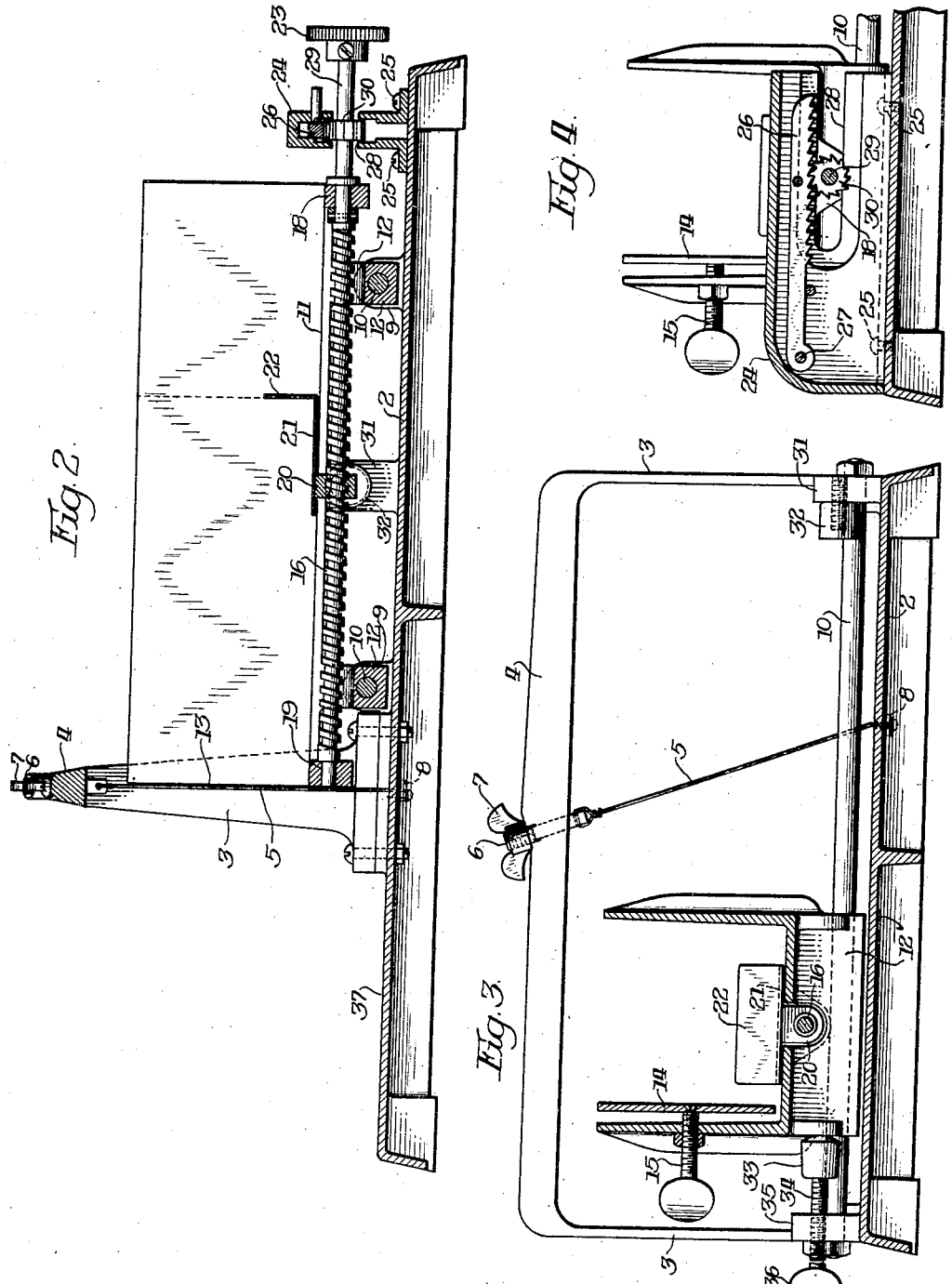

Patented Dec. 31, 1929

1,741,753

UNITED STATES PATENT OFFICE

MICHAEL LUDWIG AST, OF CHICAGO, ILLINOIS

CHEESE-CUTTING MACHINE

Application filed July 21, 1928. Serial No. 294,523.

My invention relates to machines which are chiefly used in stores where cheese is retailed or in restaurants or other places where thin slices of cheese and the clean cutting thereof are desirable factors.

The machine shown in this application is an improved and modified structure from that shown in my application filed November 12, 1927, Serial No. 232,831, cutting machines used chiefly for cutting cheese and which has eventuated in Patent No. 1,704,682.

The object of the invention is to produce a neat and effective cheese cutting machine that will cut clean cut thin slices of relatively soft cheese and lay the slices over in a desirable form for servicing to customers and will act automatically as to the thickness of the slices desired to be cut and be easily adjustable for varying thicknesses of slices and also will be handy to manipulate and be a cheap construction and easy to operate in service.

Reference will be had to the accompanying drawings in which Fig. 1 is a plan view of the machine.

Fig. 2 is a sectional elevation on line 2—2 of Fig. 1.

Fig. 3 is a transverse sectional elevational view on line 3—3 of Fig. 1.

Fig. 4 is a sectional detail elevation on line 4—4 of Fig. 1.

Figure 1:
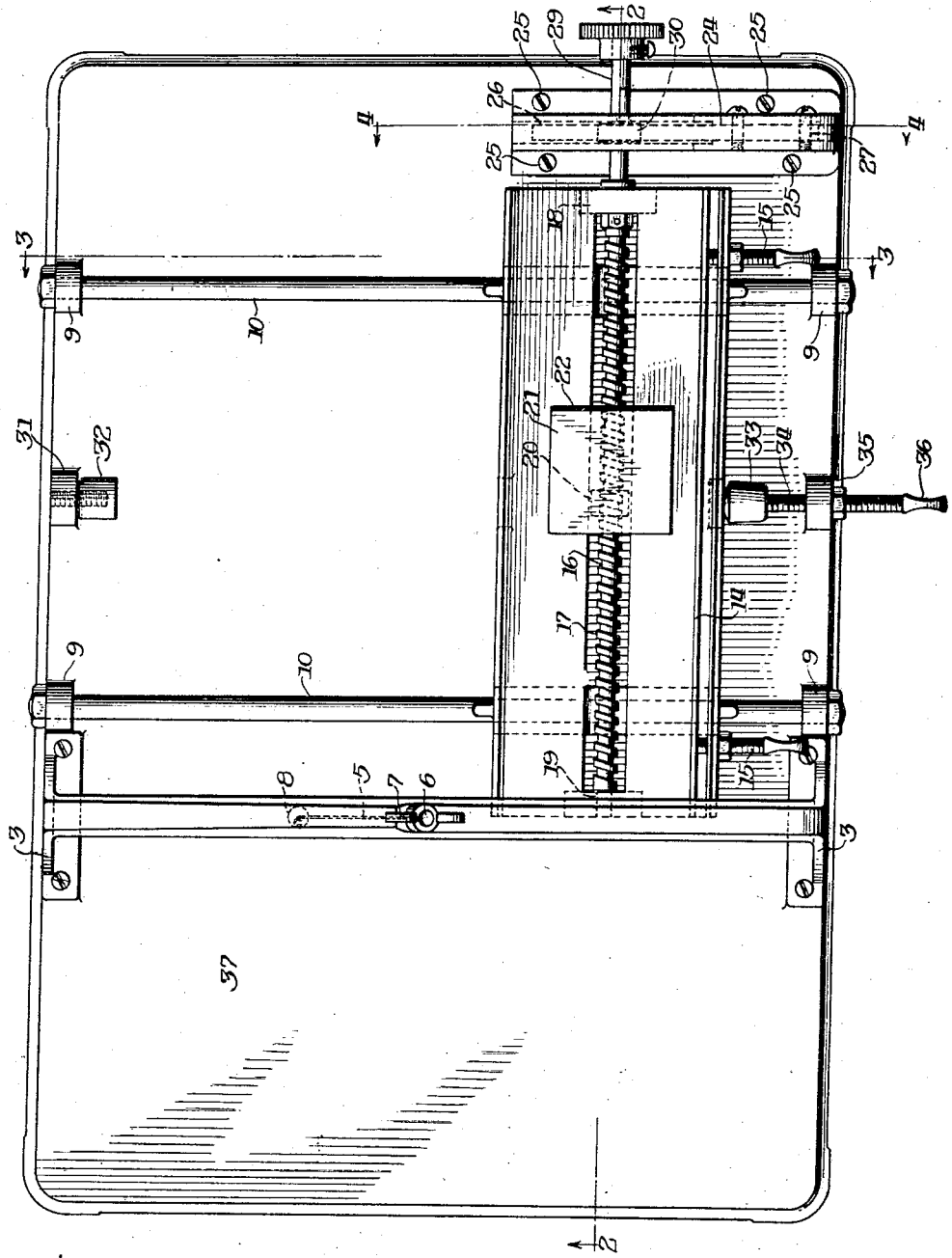

In the drawings 2 indicates the base plate of the machine preferably made of a light casting such as aluminum or similar material which is non-corroding. However, any suitable material may be used for this base plate casting but I prefer aluminum or a plated metal. Extending upward from the base plate 2 are the posts 3 of a cross bridge girder 4 from which is suspended in an inclined position a cutting wire 5 through the medium of a bolt 6 provided with a thumb nut 7, the cutting wire 5 being fastened in the base plate 2 through the medium of a nut or any other suitable means 8. Supported on projections 9 in the base casting 2 there extends cross guide rods 10 which furnish supporting guideways for a trough 11 mounted on the guideways by projections 12 in the bottom of the trough 11. Thus the trough 11 may be reciprocated back and forth across the base plate 2 causing the end 13 of the trough 11 to move closely by the inclined cutting wire 5. The trough 11 is provided with a clamping plate 14 adjusted by the screws 15 to clamp any suitable block of cheese within the trough.

The bottom of the trough is provided with an aperture 17 under which there is mounted a screw threaded shaft 16 having a bearing 18 at one end of the trough and a trunnion bearing 19 at the other end of the trough. Mounted on this shaft 16 by means of a nut 20 there is a plate 21 having an upward extending flange 22 adapted to engage the end of the block of cheese and push it forward to the cutting wire under the influence of the screw threaded shaft 16. A milled hand wheel 23 enables the shaft 16 to be revolved by hand as desired. At the rear of the frame plate 2 or opposite from where the slices of cheese are delivered there is a housing block 24 secured by screws 25 to the base 2 and on the inside of this housing block 24 there is hinged a tooth pawl block 26 on a hinge pin 27 (see Fig. 4). A slot 28 permits the end 29 of the shaft 16 to enter into this housing block 24 underneath the pawl block 26. On the shaft 16 there is a ratchet 30 adapted to be engaged by the pawl block 26 whenever the trough 11 is moved to bring the shaft 16 with its ratchet 30 into the housing 24 whereat the ratchet 30 may be engaged by the pawl block 26. On one side of the base plate 2 there is a projection 31 carrying a rubber bumper 32 adapted to arrest the movement of the trough 11 on its limit of travel on that side of the base 2 and on the opposite side of the base from the rubber bumper 32 there is a rubber stop block 33 fastened to a screw adjusting rod 34 screwed into projection 35 of the base provided with a thumb nut 36 whereby the bumper block 33 may be adjusted backward or forward toward the central portion of the base plate.

In the operation of the machine the bumper block 33 by reason of its adjustment over the surface of the base 2 limits the amount of travel of the ratchet 30 in engagement with the pawl 26 and thus limits the amount of feeding by the shaft 16 of the flange 22 that pushes forward the cheese to regulate the thickness of the slices and this is controlled by the amount of travel of the ratchet 30 in engagement with the pawl block 26 so that when a thicker or thinner slice of cheese is desired it is brought about by the adjustment of the screw 34 as described. By reference to the drawings it will be noticed that the cutting of the cheese is brought about by the movement of the trough in the position shown in Fig. 1 over to contact with the bumper block 32 and in this movement the projecting end of the block of cheese in the trough which extends beyond the wire 5 is cut off by the wire 5 passing through the end of the block of cheese and the slice thus cut off drops on the surface 37 being the upper lefthand corner of Figure 1. On the return movement of the trough back to the position shown in Fig. 1 the block of cheese is fed forward for another operation by the ratchet 30 as it is engaged by the pawl block 26.

The inclined position of the cutting wire 5 produces, as it were, a downward push on the block of cheese in the trough making a draw cut, as it were, especially desirable with soft material such as some qualities of cheese sliced for customers with this sort of an instrument.

Claims:

1. In a machine of the class described, a base, a cutting wire extending up from the base in an inclined position and supported thereon, a trough to hold a block of material to be cut and mounted in guideways and adapted to be moved forward across the location of the said cutting wire, a screw shaft mounted in the bottom of the trough and connected to a block adapted to carry forward with it a block of the material to be cut, a ratchet mounted on the said shaft and a pawl engagement adapted to revolve the said ratchet and shaft as the trough and shaft are moved across a portion of the distance of the table width.

2. In a machine of the class described, a base table, a vertically inclined cutting wire extending upwards from the said table, a trough to hold a block of material to be cut, guideways on the said table adapted to support and guide the said trough in a reciprocating movement across the location of the said cutting wire, a screw threaded shaft mounted in the said trough to feed the material through the trough, a ratchet on the said screw shaft and a pawl block to engage the said ratchet and revolve the same as the said ratchet is moved along the said pawl the said pawl being provided with a plurality of teeth for movement of the said ratchet as the latter travels along the length of the pawl.

Signed at Chicago, in the county of Cook and State of Illinois, this 18th day of July, 1928.

MICHAEL LUDWIG AST.